July 20, 1954  T. C. WHISLER  2,683,942
BLADE ATTACHMENT FOR DRAG SCRAPERS
Original Filed July 21, 1947  3 Sheets-Sheet 1
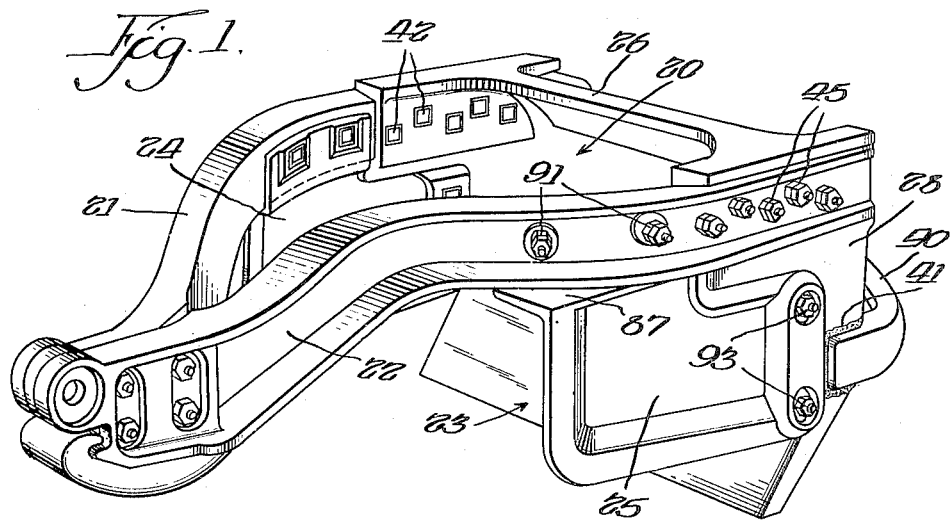
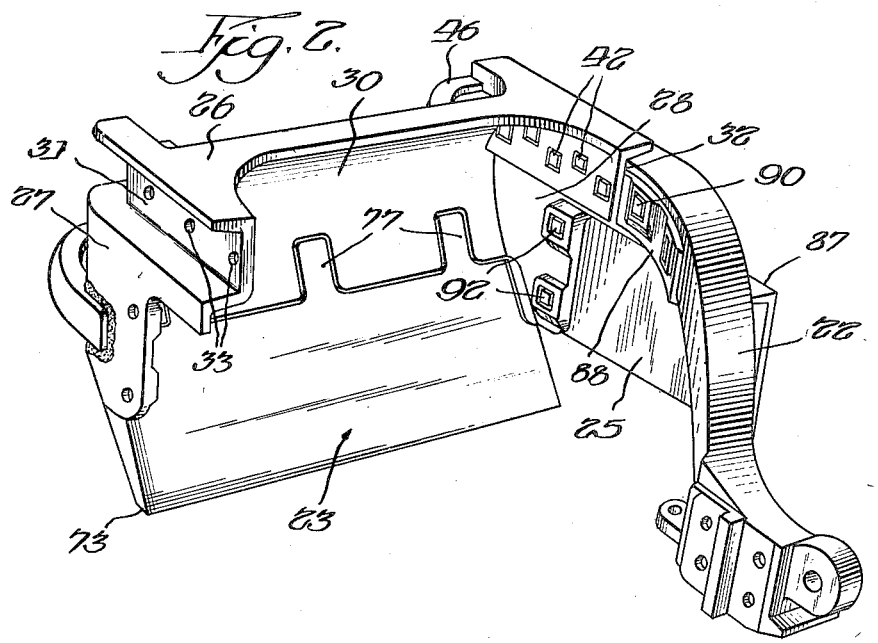
Inventor.
Thomas C. Whisler.
By Wilkinson Huxley Byron & Hume Attys July 20, 1954  T. C. WHISLER  2,683,942
BLADE ATTACHMENT FOR DRAG SCRAPERS
Original Filed July 21, 1947  3 Sheets-Sheet 2
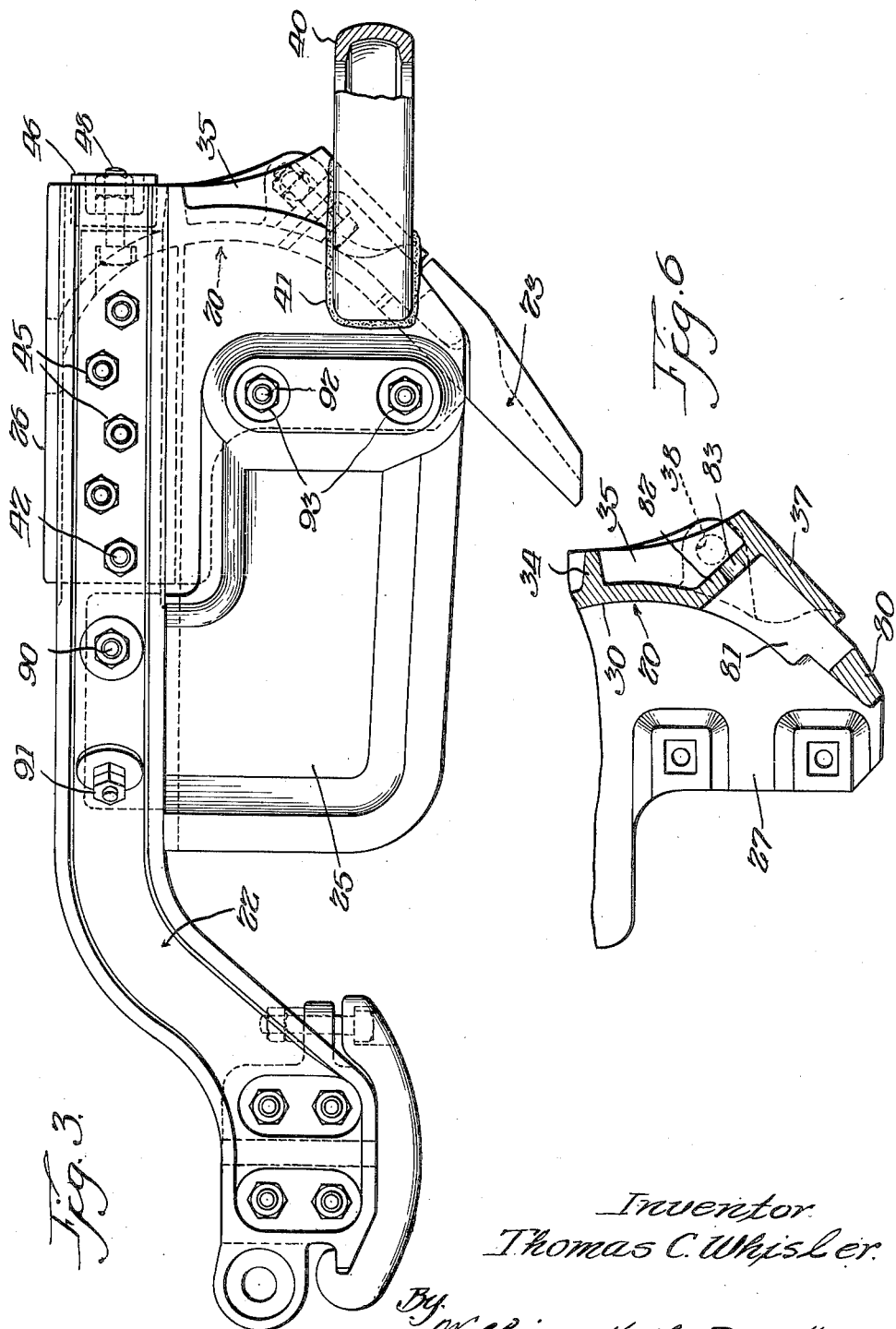
Inventor
Thomas C. Whisler July 20, 1954 T. C. WHISLER 2,683,942
BLADE ATTACHMENT FOR DRAG SCRAPERS
Original Filed July 21, 1947 3 Sheets-Sheet 3
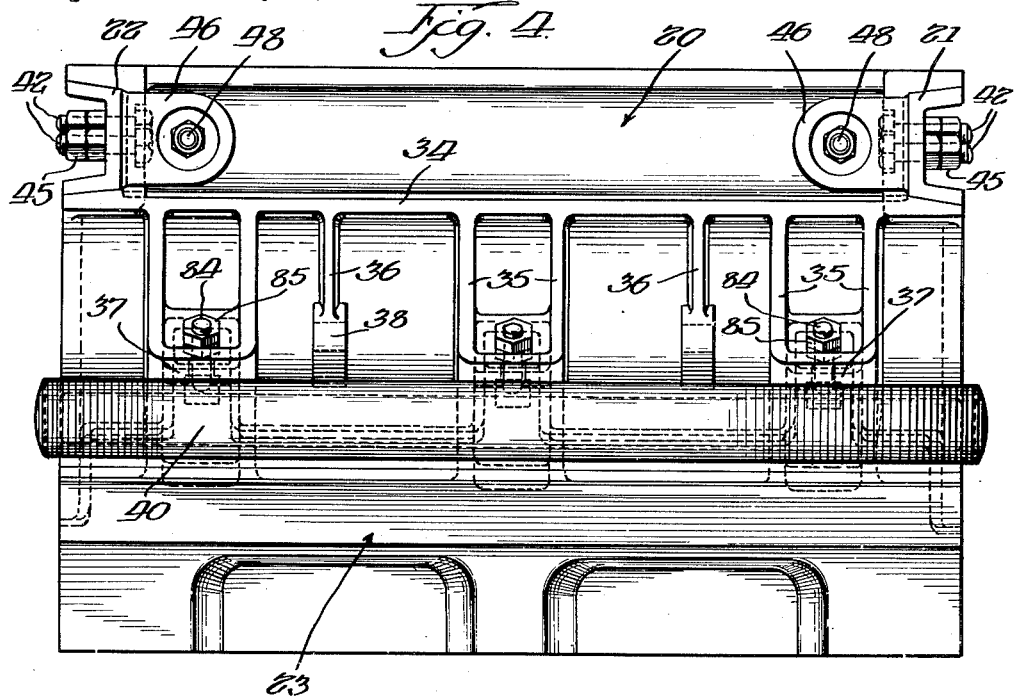
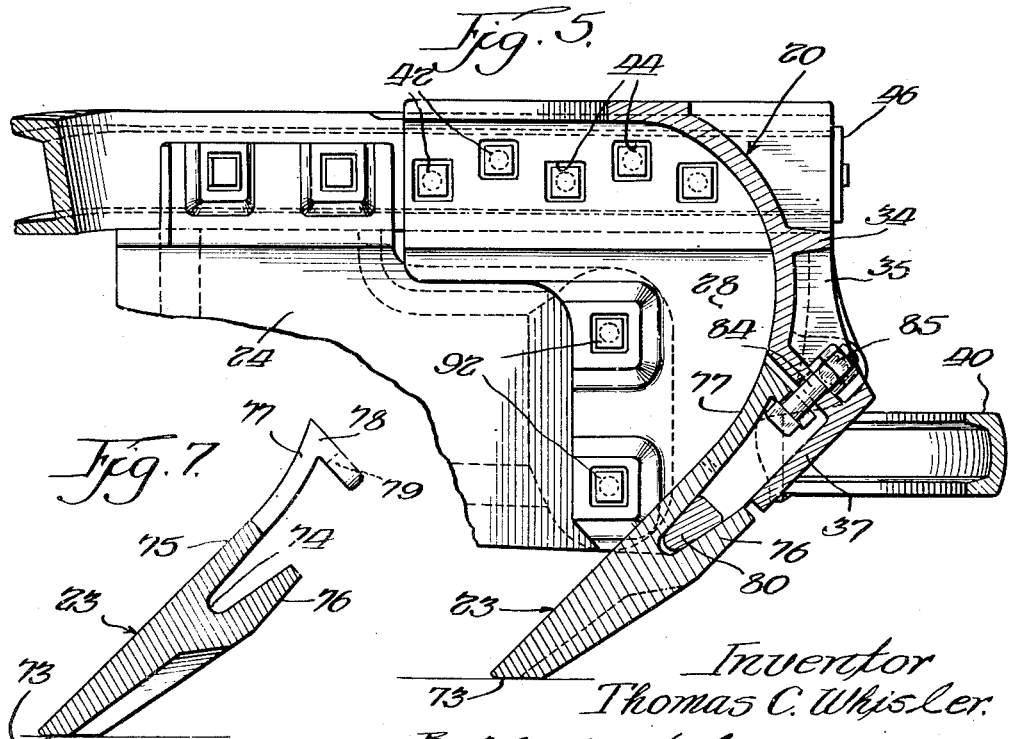
Inventor
Thomas C. Whisler.

Patented July 20, 1954

2,683,942

UNITED STATES PATENT OFFICE 2,683,942

BLADE ATTACHMENT FOR DRAG SCRAPERS

Thomas C. Whisler, Alameda, Calif., assignor to American Brake Shoe Company, New York, N. Y., a corporation of Delaware Original application July 21, 1947, Serial No. 762,305. Divided and this application April 6, 1949, Serial No. 85,911

5 Claims. (Cl. 37—141)

The invention relates to a drag scraper and has reference more particularly to a drag scraper of improved design which will be rugged and durable in construction although consisting of relatively few parts that can be economically manufactured.

An object of the invention is to provide a drag scraper essentially comprising a one-piece body member which will have a scraping blade or lip portion releasably secured thereto by fastening bolts having connection with the rear surface of the body member, and wherein the fastening bolts and the nuts secured thereto are partially housed by special structure formed integral with the body member on the rear thereof so that the bolts are protected against damage during backward travel of the scraper.

Another object resides in the provision of a drag scraper having a taper fit between the body member and blade portion whereby the weight of the scraper acts to tighten the fit between the parts. As regards this structural feature of the present scraper it may be pointed out that the fastening bolts for securing the blade portion to the body member are disposed substantially parallel to the center line of the taper fit between the parts so that upon tightening the bolts the tension is applied directly to tighten the taper fit.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a perspective view illustrating a drag scraper constructed in accordance with the invention;

Figure 2 is a perspective view showing the improved scraper of Figure 1 with one arm and one side wall removed;

Figure 3 is a side elevational view of the drag scraper of the invention;

Figure 4 is a rear view illustrating certain improved structural features formed on the rear wall of the body member;

Figure 5 is a fragmentary sectional view taken longitudinally of the scraper substantially along the center line thereof;

Figure 6 is a fragmentary sectional view showing details incorporated in the construction of the body member; and Figure 7 is a sectional view taken transversely of the blade or lip portion or the scraper showing structural details thereof.

The drag scraper selected for illustrating the present invention is disclosed in the drawings as including a body member 20 of one-piece construction substantially circular in plan, having a pair of arms 21 and 22 and a scraper blade or lip portion 23 releasably secured thereto. The side wall members 24 and 25 have interfitting relation with the arms and the body member, being releasably secured to both of these parts.

As best shown in Figures 1, 2 and 3, the body member includes a top wall 26, a pair of side walls 27 and 28 and a back wall 30 of curved formation. In accordance with the invention the side walls 27 and 28 of the body member are provided with recesses of channel shape formed integrally with the body member. Recess 31 receives the arm 21, whereas recess 32 receives the arm 22. It will be seen that each recess extends to the rear of the body member, since the arms are bent for engaging the rear wall of said member, and each recess has a top and a bottom surface which taper outwardly so that the base of the channel is of less height than the opening. A plurality of bolt openings 33 are formed in each side wall of the body member in alignment with the channel-shaped recess for receiving securing bolts by means of which the arms are secured to the body member as will be hereinafter described.

Whereas the curved back wall 30 of the body member is smooth and unobstructed throughout its inside surface, the rear surface of said back wall is provided with a horizontal reinforcing rib 34 and a plurality of vertical ribs 35 and 36 connecting with horizontal rib 34. The ribs 35 are spaced to form pairs which are joined by the wall portion 37 providing a substantially tubular formation on the rear of the body member for receiving and protecting securing bolts for the scraping blade 23 as will be presently described in detail. The vertical ribs 36 are apertured at 38 for receiving cables or the like whereby to effect rearward travel of the drag scraper. If found desirable the rear of the scraper may be protected by means of the bumper or rear guard 40 substantially semi-circular in plan, as shown in Figure 1, and which is suitably welded as at 41 to the side walls 27 and 28 of the body member.

The arms, adapted to have releasable securement to the body member by means of the channel-shaped recesses 31 and 32 provided therefor, are probably best illustrated in the perspective views, Figures 1 and 2. Each arm is channel-shaped in cross section and the top and bottom surfaces thereof taper so as to fit the tapering formation of the channel-shaped recesses whereby the maximum rigidity is obtained between the parts when the arms are bolted to the body member. For this purpose the bolts 42 are provided which extend through openings 43 in the body member and through openings in the respective arms. The heads of the bolts are square and the inside surface of the body member are provided with square socket openings 44 for receiving said square heads. The securing nuts 45 are threaded to the projecting end of the bolts, having location within the channels of the arms, and by tightening said nuts the parts are securely united as described. It will be observed that each arm is provided with an integral lug 46 having a right angle relation with its adjacent portion of the arm and which lug is adapted to extend around the rear of the body member, as shown in Figure 4, whereby such interfitting relation of the arms with the body member acts to relieve the securing bolts of excessive stresses and strains. The lug 46 of each arm is provided with an opening adapted to receive a securing bolt such as 48 which passes through the rear wall of the body member and through said lug for additionally securing each arm to the body member. At their forward end the arms have a special formation by means of which they have interlocking relation for rigidly securing the arms together.

The blade portion 23 of the drag scraper is substantially rectangular in shape, as is clearly evident by reference to Figure 2. The bottom surface 73 is bevelled to form a scraping edge and the top edge of the blade portion is formed with a tapering recess 74 providing the bifurcated wall sections 75 and 76. The front wall section 75 has formed integral therewith a plurality of extensions 77, three being shown in the illustrated embodiment, and each extension includes the depending end 78 having a right angle relation with its extension. Each depending end is slotted at 79. The rear wall 30 of the body member has a bottom edge 80, as best shown in Figure 5, which tapers in a direction downwardly for interfitting relation with the recess 74. At spaced locations along its bottom edge 80 the rear wall 30 is slotted to form the openings 81, three of these slotted openings being provided, and it will be observed that the same are located so as to align with the extensions 77 when the blade portion is properly associated with the body member. The slots 81 have a top terminal edge formed by the wall 82, which wall joins the curved wall 30 with the wall portion 37. Said wall 82 may be considered as the bottom of its respective tubular formation located on the rear of the back wall as previously described and which comprises a pair of ribs 35 and the wall portion 37.

Upon assembling the blade portion 23 with the back wall 30 of the scraper the bottom edge 80 will have location in the tapering recess 74 and the extensions 77 will align with the slots 81. As a result of this interfitting relation of the parts and depending end 78 of each extension is located adjacent and substantially parallel with its respective wall 82. Also the slot 79 in each depending end 78 is aligned with a bolt receiving opening 83 in wall 82 and for securing the blade portion to the body member each slot 79 retains the head of a bolt 84, Figure 5, which extends through its aligned opening 83 to project into the tubular formation provided therefor. The bolts receive the threaded nuts 85 for securing the same in place.

An important feature of the invention resides in the location of the securing bolts 84 substantially on the center line of the taper fit between the blade portion and the body member. As a result the action of tightening the bolts 84 is applied directly to the blade portion and in a manner to tighten the taper fit in direct proportion to the tightening action of the bolts. The structure has been designed for ready accessibility to the tightening nuts 85 although the same are protected from damage by means of the surrounding tubular formation. Removability of the blade portion is materially facilitated by said structure since the blade portion can be removed and another one applied to the body member merely by manipulation of the nuts 85 on the securing bolts 84. With the blade portion securely bolted in assembled relation to the body member it will be seen that the extensions 77 have a slight curvature which forms a continuation of the curved inner surface of the rear wall 30.

Each side wall member 24 and 25 has releasable securement to the body member and to its respective arm. For this purpose each member has a special formation which may be described as a double bend. For example, referring to side wall member 25, as shown in Figure 2, it will be observed that the member has an intermediate horizontal portion 87 located in contact with the underside of the arm 22 and said portion is extended on the inside of the arm providing the interior flange 88. Said flange 88 and the horizontal portion 87 of the side member 25 therefor have contact with the inside wall and the bottom wall of its arm 22. The flange 88 is directly secured to the arm 22 by bolts 90 which receive the threaded nuts 91. The heads of said bolts 90 are square, similar in all respects to bolts 42, and the flange 88 is formed with bosses having square openings for receiving the heads. The side wall member 25 is additionally secured to the body member by means of bolts 92 which extend through from the inside and receive the securing nuts 93. Here also the bolts 92 have square heads which are received by square openings located in bosses formed on the inside wall of the body member.

The formation of the side wall member 24 is similar to that of member 25, the same having an intermediate horizontal portion 87 and an inside flange 88. Bolts 90 are provided for securing the flange to arm 21 and bolts 92 are also employed for securing the side wall member to the body member exactly as described with respect to side wall 25.

This application is a divisional application of my copending application Serial No. 762,305, filed July 21, 1947, now Patent No. 2,626,471 and entitled Scraper Bucket.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a drag scraper, in combination, a body member having side walls and a forwardly concave back wall, a marginal portion of said back wall being wedge-shaped in transverse cross section and said back wall having a plurality of slotted openings spaced along the length of the marginal portion, each slotted opening having a top and a back wall portion, a blade member provided with a wedge-shaped groove along the top edge thereof for receiving the wedge-shaped marginal portion of the back wall, said blade member having a plurality of extensions along the grooved top edge aligning with and adapted to enter the slotted openings respectively in assembling the blade member on the back wall, and means releasably securing the blade member to the back wall in assembled relation, said means including a securing bolt for each slotted opening disposed substantially parallel to the center line of the taper fit between the parts and having contact with the extension in the opening and with the respective top wall portion.

2. A drag scraper as defined by claim 1, additionally including a plurality of formations on the rear of the back wall, each formation being formed in part by the back wall portion of its respective slotted opening and providing means for receiving and protecting the head of the securing bolt for that slotted opening.

3. In a drag scraper, in combination, a body member having side walls and a forwardly concave back wall, the bottom edge of said back wall being wedge-shaped in transverse cross section and said back wall having a plurality of slotted openings spaced along the length of the said bottom edge, each slotted opening having a top and a back wall portion integral with the said back wall, a blade member provided with a wedge-shaped groove along the top edge thereof for receiving the wedge-shaped bottom edge of the back wall, said blade member having a plurality of extensions along the grooved top edge aligning with and adapted to enter the slotted openings respectively in assembling the blade member on the back wall, and securing bolts for releasably securing the blade member to the back wall in assembled relation, a securing bolt for each slotted opening disposed substantially on the center line of the taper fit between the parts and having contact with the extension in the opening and with the respective top wall portion.

4. In a drag scraper, in combination, a body member including a back wall adapted to have a blade member releasably secured to the bottom edge thereof, said bottom edge of the back wall being wedge-shaped in transverse cross section and said back wall having a plurality of slotted openings spaced along the length of the bottom edge, a top wall defining the top edge of each opening and extending rearwardly of the back wall, a blade member provided with a wedge-shaped groove along the top edge thereof for receiving the wedge-shaped bottom edge of the back wall when the parts are assembled in operative relation, a plurality of extensions provided by the blade member along the top edge thereof adapted to align with and enter the slotted openings respectively, and securing bolts for releasably securing the blade member to the back wall in assembled relation, the securing bolt for each slotted opening being disposed substantially on the center line of the taper fit between the parts and having contact with the extension in that opening and with the top wall of the opening.

5. A drag scraper as defined by claim 4, additionally including an ear formed on each extension at the top edge thereof and projecting rearwardly in a direction parallel with its respective top wall, and wherein the securing bolt for the particular slotted opening has contact with the top wall thereof and with the ear on the extension located in the opening.

References Cited in the file of this patent

UNITED STATES PATENTS

| Number | Name | Date |
| --- | --- | --- |
| 866,971 | Sherwood | Sept. 24, 1907 |
| 1,417,183 | Lawton | May 23, 1922 |
| 1,642,191 | Bager et al. | Sept. 13, 1927 |
| 2,390,611 | Nixon | Dec. 11, 1945 |
| 2,482,320 | Clemmer | Sept. 20, 1949 |